3,530,149
METHOD OF PREPARING α-METHYL-
γ-ISOBUTYL-BUTYROLACTONE
Alberto Fiecchi, Turin, Italy, assignor to Collins Chemical
Co., Inc., New York, N.Y.
No Drawing. Filed Dec. 23, 1966, Ser. No. 604,123
Int. Cl. C07d 5/06
U.S. Cl. 260—343.6                          5 Claims

ABSTRACT OF THE DISCLOSURE

A novel flavoring agent, α-methyl-γ-isobutyl-butyrolactone, is prepared from 2-morpholino-4-methyl-1-pentene. The latter is reacted with methyl- or ethyl-bromopropionate in the presence of a tertiary amine, the reaction product (ester) is saponified with alkali, the keto-group in the ester is reduced, and the lactone ring is formed by acidification with aqueous mineral acid.

---

This invention relates to flavoring agents useful, e.g. in the foodstuff, pharmaceutical and perfumery industries.

The invention concerns more particularly a novel flavoring agent of the empirical formula $C_9H_{16}O_2$ and of the structural formula:

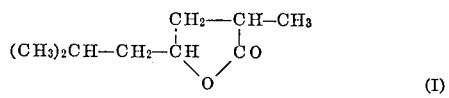

(I)

in accordance with which the agent shall be hereafter referred to as α-methyl-γ-isobutyl-butyrolactone. It could also be referred to as lactone of the 2,6-dimethyl-4-hydroxyheptanoic acid.

This lactone is a colorless liquid, distillable in vacuum preferably below 20 mm. Hg and it typically boils at 65° C. at 0.5 mm. Hg. Its infrared spectrum exhibits the sharp band peculiar to γ-lactones at 1775 cm.$^{-1}$. The lactone is soluble in alcohols, such as ethanol, methanol, glycols, benzyl alcohol, in aprotic dipolar solvents such as acetone, acetonitrile, dimethylformamide, in ethers such as ethyl ether, in esters such as triacetin, in aliphatic, aromatic and chlorinated hydrocarbons, in vegetable oils, in fats and in glycols. It is slightly soluble in water and solutions of alkali bicarbonates, but dissolves in aqueous solutions of alkali metal hydroxides.

This lactone has a very pleasant, penetrating and persistent smell, of a herbaceous-creamy nature. It may be employed alone or combined, for a large variety of purposes.

The α-methyl-γ-isobutyl-butyrolactone is very effective in reinforcing and fixing. Also, since the lactone withstands high temperatures it can be used in aromatic compositions which are subjected to high temperature processing.

Moreover, said lactone is one of the rare flavorings allowing of extreme variations in dose. Even at high concentrations, the lactone never confers a chemical taste to the product in which it is incorporated. Although a saturation point may be reached, wherein further increases in the flavoring agent concentration do not result in any additional flavor, no disagreeable side effects have been perceived. Consequently, it is not thought necessary to indicate special concentration limits for the present flavoring agent.

Thus the invention also includes flavoring compositions containing α-methyl-γ-isobutyl-butyrolactone. In these compositions the lactone is substantially dissolved in one or a plurality of the above recited solvents and/or aromatic mixtures. Solutions of the instant lactone in vegetable oils, such as palm-nut oil, coconut-oil, olive oil and other oils, in natural or synthetic fats, such as cacao butter, and in glycols were found just as useful, particularly in the cosmetic, perfume and foodstuff industries. Alternatively, in the composition according to this invention the lactone may be absorbed onto a solid carrier, such as starch, gums, baking powders, or mineral powders such as talcum. The proportion of lactone in all such compositions is a matter of choice, so that it is not thought advisable to set particular limits herein. Impregnation of a solid carrier may be very easily effected by dissolving the lactone in a volatile solvent, such as ethanol, acetone or ethyl ether, impregnating the carrier by means of this solution and evaporating the solvent employed. A similar technique may be adopted for homogeneously dispersing the lactone, for instance in a fat of a more or less high consistency. Alternatively, conventional milling or kneading machine can be employed, such as of the type known in the cosmetic industry.

Finally, the invention concerns a novel, useful and advantageous method of preparing the instant lactone.

Only one method is available from the literature for actual use in the synthesis of α,γ-substituted lactones, which consists in treating an α,β-, β,γ- or γ,s-olefincarboxylic acid with a strong mineral acid. The latest use of this method was published by S. Obata (J. Pharm. Soc. Japan, 73, 1295 (1953). However, this method is objectionable in several aspects, namely, its use of particularly corrosive acids, such as 85% sulphuric acid, the difficulty in obtaining intermediates, its low yields and the formation of considerable quantities of by-products, which makes recovery of the lactone difficult and expensive.

With the method of the invention α-methyl-γ-isobutyl-butyrolactone (I) can be obtained through well-defined intermediates by very simple reaction steps. The method can be diagrammatically pictured as follows:

2-morpholino-4-methyl-1-pentene

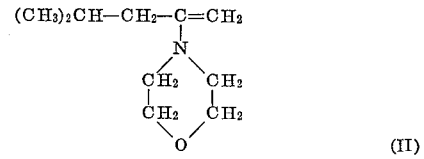

(II)

reacts with methyl- or ethyl-2-bromopropionate:

(wherein R is —$CH_3$ or —$C_2H_5$) in the presence of a tertiary amine:

(wherein R' is —$CH_3$ or —$C_2H_5$; and wherein R" is —$CH_3$, —$C_2H_5$ or —$C_6H_5$) in an aprotic dipolar solvent, typically at a temperature of 50° C. to 150° C. This reaction generally takes 10 to 30 hours. Subsequently, by admixing the reaction mixture with a dilute aqueous solution of a mineral acid (typically hydrochloric or sulphuric acid), a neutral oily phase is separated which essentially comprises the methyl or ethyl ester of the 2,6-dimethyl-4-keto-heptanoic acid:

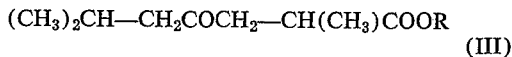

(III)

wherein R is methyl or ethyl.

By saponifying this ester with NaOH or KOH the corresponding 2,6-dimethyl-4-heptanoate of the alkali metal is obtained:

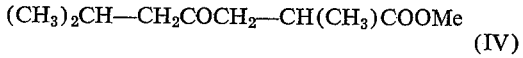

(IV)

wherein Me is Na or K, from which reduction of the keto-group to the alcoholic group yields the 2,6-dimethyl-4-hydroxyheptanoate of sodium or potassium:

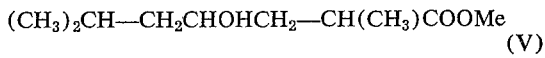
(CH₃)₂CH—CH₂CHOHCH₂—CH(CH₃)COOMe (V)

which on acidification with a dilute aqueous solution of a mineral acid (typically hydrochloric or sulphuric acid) is converted to the desired lactone (I).

The 2-morpholino-4-methyl-1-pentene and the method of preparing it were described by R. Fusco et al. (Gazz. Chim. Ital. 92, 382 (1962)). For the purposes of the instant method it is dissolved together with the bromopropionate and tertiary amine mentioned above in at least substantially equimolar proportions in the aprotic dipolar solvent. Trimethylamine, triethylamine or dimethylaniline is preferably employed as the tertiary amine. The solvent preferably consists of acetonitrile, dimethylformamide, dimethylacetamide, dimethylsulfoxide, N-methyl-2-pyrrolidone, tetrahydrothiophene-dioxide, nitrobenzene or mixtures thereof. The reaction is promoted by stirring throughout the reaction period (10–30 hours). On completion of the reaction a mixture containing a crystalline precipitate is obtained and is allowed to cool at room temperature.

Admixture thereto of a sufficient quantity of a dilute aqueous solution of a mineral acid, such as hydrochloric or sulphuric acid, will cause the crystalline phase to dissolve, leaving two liquid phases, namely an aqueous heavy phase and an oily light phase essentially comprising the ester (III).

The ester (III) in pure state is a colorless actually water-insoluble liquid which dissolves in conventional organic solvents, such as ethyl ether, benzene and chloroform. It is recovered from the reaction mixture by separating the oily phase from the aqueous phase by extraction with one of the above mentioned solvents. The extraction step is preferably carried out three times, whereupon the three extracts are brought together and the solvent is removed by distillation, usually at atmospheric pressure. The oily residue is rectified in vacuum, preferably below 20 mm. Hg and the ester (III) is thus obtained (boiling point 85° C. at 0.5 mm. Hg).

Saponification of the ester is effected by conventional methods. Typically, the ester is admixed with ethyl alcohol (in which it is highly soluble) and a molar excess (about twice as much) of a concentrated aqueous solution of sodium or potassium hydroxide and refluxed about two hours. The solution is then concentrated (preferably at a reduced pressure of 300–500 mm. Hg) in order to remove the organic solvent.

The liquid residue which contains the salt (IV) is then dissolved in water, in which the salt is soluble, and admixed with a slight excess of sodium borohydride (NaBH₄) which has been previously dissolved in water. This reagent quantitatively reduces the keto-group in the salt (IV) to alcoholic group, whereby the oxyheptanoate (V) is obtained. The reduction reaction takes 8 to 24 hours.

After this period has elapsed, the resulting solution is acidified to a pH of between 1.5 to 3.5 by means of a dilute aqueous solution of a mineral acid (typically sulphuric or hydrochloric acid) till a heavy aqueous phase and an oily organic light phase appear, the latter essentially comprising the lactone (I). The oily phase is separated from the aqueous one, the latter being then extracted by means of a water-immiscible organic solvent (typically ethyl ether) till practically complete removal of the aqueous phase of the peculiar strong odor of the lactone (I). The organic extracts are mixed with the oily phase and distilled (usually at room pressure) in order to remove the solvent. Finally, the residue is distilled in vacuum, preferably at 0.5 mm. Hg, and collecting the fraction boiling at 65° C. This is a liquid having the typical characteristics of α-methyl-γ-isobutyl-butyrolactone (I).

A specific embodiment of this invention is carried out as follows.

(A) PREPARATION OF THE ETHYL 2,6-DIMETHYL-4-KETOHEPTANOATE

A solution was obtained by dissolving 114 g. (0.67 mole) of 2-morpholino-4-methyl-1-pentene in 250 ml. acetonitrile. The solution was admixed with 120 g. (0.67 mole) of ethyl-2-bromopropionate and 67 g. (0.67 mole) of triethyl amine at room temperature.

The solution is maintained at 80° C. during 24 hours and, upon cooling to room temperature, is admixed with 300 ml. aqueous 10 weight percent hydrochloric acid (about 0.85 mole), whereby the mixture separates into two phases.

The mixture is then extracted three times using 200 ml. of ethyl ether in each extraction. The ether solutions are then mixed, washed with an aqueous 2% by weight sodium bicarbonate solution, washed with water, and finally dried on sodium sulfate.

The resulting anhydrous extract is evaporated at room pressure until almost complete removal of ether The liquid residue is rectified in vacuum and the colorless liquid fraction, boiling at 85° C. at 0.5 mm. Hg, is collected. The product is ethyl 2,6-dimethyl-4-ketoheptanoate. Its infrared spectrum exhibits characteristic strong bands at 1740 cm.⁻¹ (ester) and at 1710 cm.⁻¹ (ketone).

(B) PREPARATION OF THE LACTONE 43 g. (0.215 mole) of ethyl 2,6-dimethyl-4-ketoheptanoate obtained as above were dissolved in a solution comprising 300 ml. ethanol and 43.5 ml. aqueous 30% sodium hydroxide solution (about 0.43 mole).

The resulting solution was refluxed for two hours, and concentrated at 450 mm. Hg with most of the ethanol therein evaporating. On reduction of its volume to 80 ml., the solution was cooled, diluted with 200 ml. water and admixed (at room temperature, and under cooling if necessary) with a solution of 2.3 g. (0.06 mole) of sodium borohydride in 10 ml. water.

After 12 hours the mixture is acidified by adding 175 ml. of aqueous 10% hydrochloric acid (about 0.5 mole), two phases being obtained. The organic upper phase is separated and the heavy aqueous phase extracted three times with 100 ml. ethyl ether each time. The ether solutions are mixed with the organic phase and this extract is washed first with an aqueous 3 weight percent sodium bicarbonate solution, and then with water. Upon drying on sodium sulfate, the ether in the extract is almost fully evaporated therefrom, by first operating at atmospheric pressure, and then in vacuum.

From the residue, a colorless liquid is distilled at 65° C. and at 0.5 mm. Hg. The product is the α-methyl-γ-isobutylbutyrolactone. Its infrared spectrum (obtained by operating on the liquid) exhibits a strong sharp band at 1775 cm.⁻¹ (γ-lactone).

What I claim is:

1. Method of preparing α-methyl-γ-isobutyl-butyrolactone comprising:
    (a) reacting 2-morpholino-4-methyl-1-pentene in a dipolar aprotic solvent with an alkyl 2-bromopropionate, wherein the alkyl is selected from the class consisting of methyl and ethyl, and with a tertiary amine of the formula NR′₂R″, wherein R′ is selected from the class consisting of methyl and ethyl and R″ is selected from the class consisting of methyl, ethyl and phenyl, to obtain the corresponding alkyl ester of 2,6-dimethyl-4-keto-heptanoic acid;
    (b) saponifying the ester with alkali to obtain the corresponding alkali metal salt;
    (c) reducing the keto-group in the salt by means of aqueous sodium borohydride thereby to obtain the corresponding alkali metal 2,6-dimethyl-4-oxyheptanoate;
    (d) acidifying the reaction mixture of (c) with aqueous mineral acid until the said heptanoate is converted to the desired butyrolactone and a two-phase liquid system is obtained; and (e) recovering the lactone from the system.

2. The method of claim 1, wherein the ester product of step (a) is recovered from its reaction mixture by acidifying the latter with aqueous dilute mineral acid until a liquid two-phase system is obtained, separating the ester from the system by solvent-extraction, and separating from the extract its solvent and water contents by distillation and drying.

3. The method of claim 1, wherein the dipolar aprotic solvent is selected from the class consisting of: acetonitrile, dimethylformamide, dimethylacetamide, dimethylsulfoxide, N-methyl - 2-pyrrolidone, tetrahydrothiophenedioxide and nitrobenzene.

4. In the method of claim 1, the step (d) comprising acidifying the said reaction mixture of (c) to a pH value of from 1.5 to 3.5.

5. The method of claim 1, wherein the step (e) comprises separating the lactone from the said system by separating the light phase from the heavy phase, attracting the heavy phase with a water-immiscible organic solvent for the lactone, uniting the extract and the light phase, distilling-off the solvent from the so obtained mixture and recovering the lactone from the residue by vacuum-distillation.

References Cited

UNITED STATES PATENTS

| 2,476,668 | 7/1949 | Kharash et al. | 260—343.6 |
| 2,683,721 | 7/1954 | Schlesinger et al. | 260—343.6 |

FOREIGN PATENTS

| 1,075,456 | 7/1967 | Great Britain. |

ALEX MAZEL, Primary Examiner

A. M. T. TIGHE, Assistant Examiner

U.S. Cl. X.R.

99—140; 260—247, 535, 483, 526; 252—522